(12) United States Patent
Kobayashi

(10) Patent No.: US 9,952,599 B2
(45) Date of Patent: Apr. 24, 2018

(54) DRIVING CONTROL DEVICE

(71) Applicant: HONDA MOTOR CO., LTD., Tokyo (JP)

(72) Inventor: Sachio Kobayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/257,094

(22) Filed: Sep. 6, 2016

(65) Prior Publication Data
US 2017/0068248 A1 Mar. 9, 2017

(30) Foreign Application Priority Data

Sep. 7, 2015 (JP) .................................. 2015-175794

(51) Int. Cl.
G05D 1/02 (2006.01)
B62D 15/02 (2006.01)
B60W 30/165 (2012.01)
G01C 21/26 (2006.01)

(52) U.S. Cl.
CPC ......... G05D 1/0246 (2013.01); B60W 30/165 (2013.01); B62D 15/025 (2013.01); B62D 15/026 (2013.01); G01C 21/26 (2013.01); G05D 2201/0213 (2013.01)

(58) Field of Classification Search
CPC combination set(s) only.
See application file for complete search history.

(56) References Cited

U.S. PATENT DOCUMENTS

2006/0095195 A1* 5/2006 Nishimura .......... B60W 30/025 701/96
2015/0367850 A1* 12/2015 Clarke ................ B60W 30/00 701/28

FOREIGN PATENT DOCUMENTS

| JP | 2007-008281 A | 1/2007 |
| JP | 2010-170396 A | 8/2010 |
| JP | 2011-514580 A | 5/2011 |

OTHER PUBLICATIONS

Office Action dated Jul. 4, 2017, issued in counterpart Japanese Patent Application No. 2015-175794, with English translation. (6 pages).

* cited by examiner

Primary Examiner — Anne M Antonucci
Assistant Examiner — Renee LaRose
(74) Attorney, Agent, or Firm — Westerman, Hattori, Daniels & Adrian, LLP

(57) ABSTRACT

A driving control device uses a recognition reliability, and more specifically, uses an inter-vehicle distance, a radius of curvature of a road, and a gradient of the road, to determine detection precision with respect to a leading vehicle. Lane markings are set as restriction positions in cases in which the recognition reliability for the leading vehicle is greater than or equal to a reference. Positions closer to the vehicle than the lane markings are set as the restriction positions in cases in which the recognition reliability for the leading vehicle is lower than the reference.

12 Claims, 7 Drawing Sheets

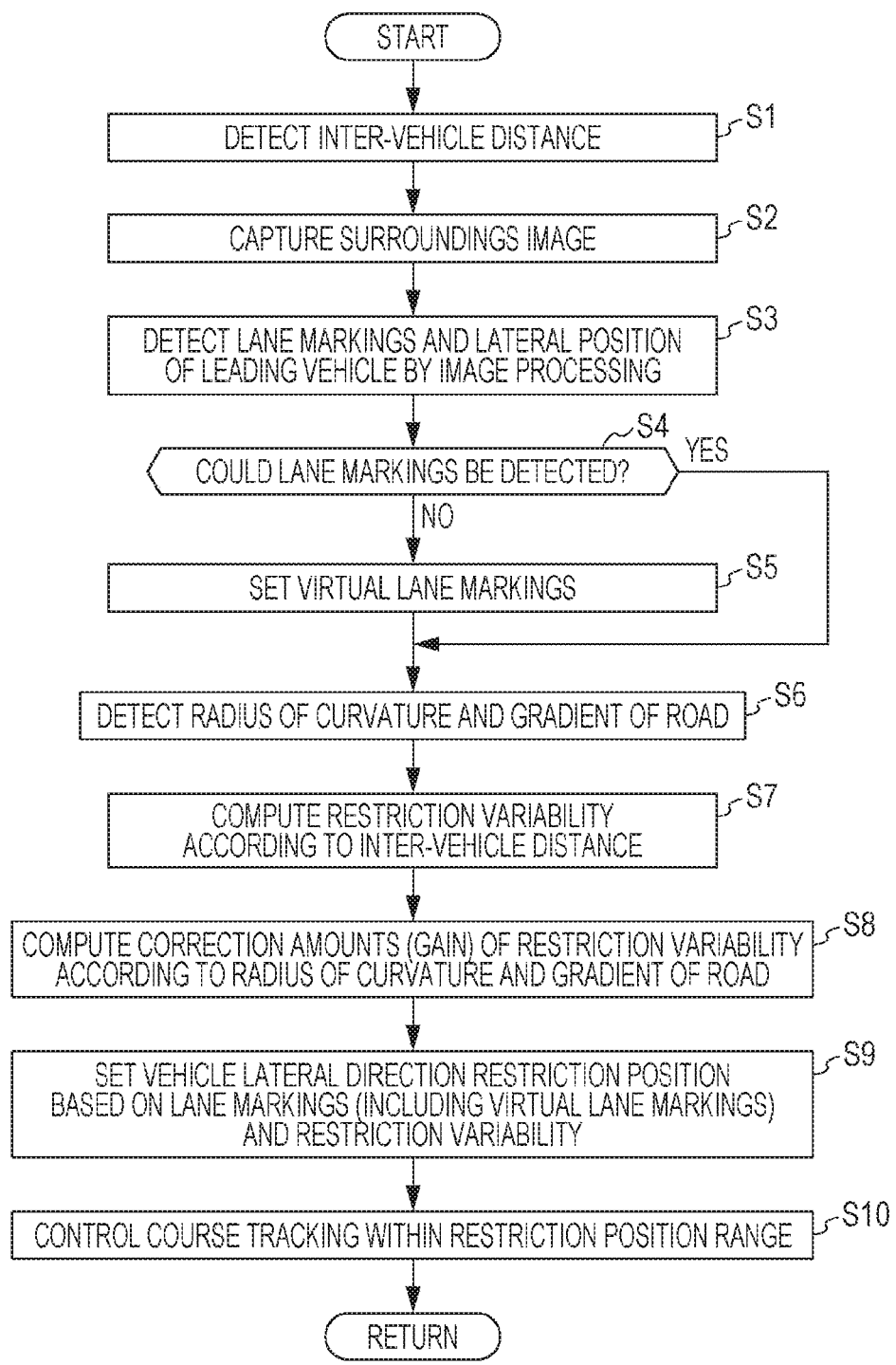

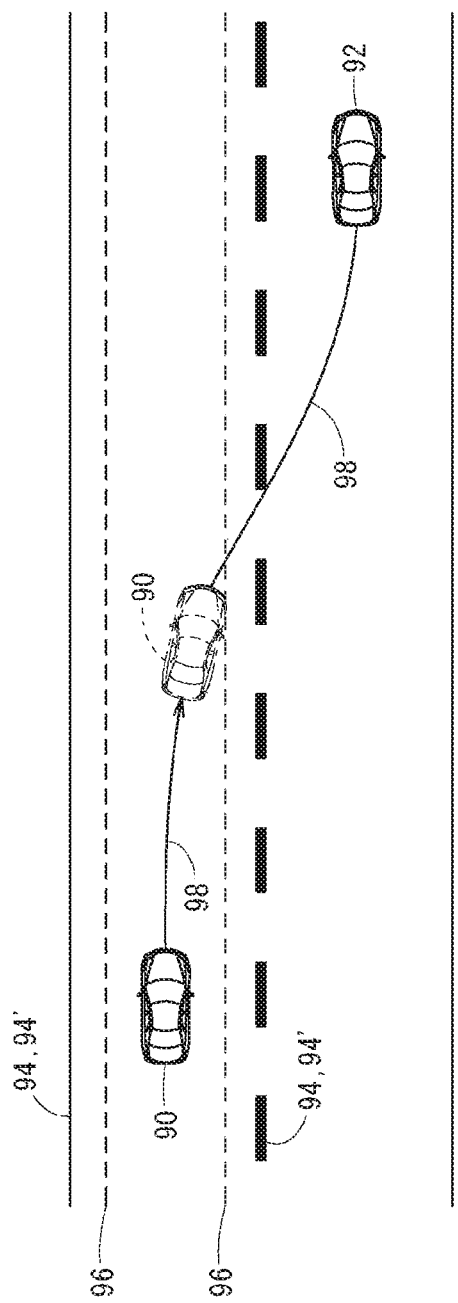

DRIVING CONTROL DEVICE

CROSS REFERENCES TO RELATED APPLICATIONS

The present application claims priority under 35 U.S.C. § 119 to Japanese Patent Application No. 2015-175794, filed Sep. 7, 2015, entitled "Driving Control Device." The contents of this application are incorporated herein by reference in their entirety.

TECHNICAL FIELD

The present disclosure relates to a driving control device that restricts movement of a vehicle in a lateral direction while recognizing a leading vehicle.

Recent vehicles are provided with driving control devices that control driving by using an onboard camera to recognize a leading vehicle. For example, there are driving control devices that perform course tracking control, namely, automatic control or driving assistance in which the vehicle tracks a driving course of a leading vehicle within a range restricted by restriction positions such as lane markings. Driving control devices that perform course tracking control cause the vehicle to track the driving course of the leading vehicle within a movement range demarcated by left and right lane markings or restriction positions.

BACKGROUND

Japanese Unexamined Patent Application Publication (Translation of PCT Application) No. 2011-514580 (Abstract, Paragraphs [0038], [0040], FIG. 2) describes a driving control device that performs course tracking control. In cases in which an inter-vehicle distance between the vehicle and the leading vehicle is less than a limiting distance, and/or in cases in which an angle between a front-rear direction axis of the vehicle and a line of sight from the vehicle to a central point on a rear face of the leading vehicle (a tow angle) is less than a limiting angle, automatic control is performed such that the vehicle tracks the driving course of the leading vehicle.

When the inter-vehicle distance is the limiting distance or greater or the tow angle is the limiting angle or greater, the driving control device of Japanese Unexamined Patent Application Publication (Translation of PCT Application) No. 2011-514580 disengages the course tracking control. Since situations in which the inter-vehicle distance becomes large and situations in which the tow angle becomes large, for example on curves, arise frequently, the limiting distance and the limiting angle need to be set higher in the driving control device of Japanese Unexamined Patent Application Publication (Translation of PCT Application) No. 2011-514580 so that course tracking control does not disengage so readily. However, performing course tracking control in a situation where the inter-vehicle distance is great, or in a situation of driving along a curve, presents the following issue.

In cases in which the inter-vehicle distance is great, the distance between the onboard camera and the leading vehicle is great. Thus, the detection precision with respect to the leading vehicle based on images captured by the onboard camera is low compared to cases in which the inter-vehicle distance is small. Moreover, in cases in which the degree of curvature of a curve is great, specifically, cases in which the radius of curvature is small, it is difficult to image the rear face of the leading vehicle using the onboard camera. Thus, the detection precision with respect to the leading vehicle based on images captured by the onboard camera is low compared to when driving along a straight road. Thus, erroneous recognition by the vehicle that the leading vehicle is moving in a lateral direction sometimes occurs even when the leading vehicle is stably driving along the center of a vehicle lane. Erroneous recognition may produce errors in steering control, and destabilizes the driving of the vehicle. In cases in which the error is great, course tracking control itself can become difficult.

SUMMARY

The present disclosure describes, for example, a driving control device capable of driving the vehicle stably even when the detection precision with respect to a leading vehicle based on images captured by an onboard camera is low.

For example, the present disclosure describes a driving control device including: an imaging section that captures an image of surroundings of a vehicle; a leading vehicle recognition section that recognizes a leading vehicle from the image captured by the imaging section; and a lateral direction movement restriction section that, based on the image captured by the imaging section, sets a restriction position for a movement range in a lateral direction of the vehicle. The lateral direction movement restriction section sets a specific position as the restriction position in cases in which a recognition reliability for the leading vehicle by the leading vehicle recognition section is greater than or equal to a reference, and sets a position closer to the vehicle than the specific position as the restriction position in cases in which the recognition reliability is lower than the reference. Note that the lateral direction movement restriction section may bring the restriction position closer to the vehicle as the recognition reliability declines.

For example, in the present disclosure, detection precision with respect to the leading vehicle is determined using indices, namely, the recognition reliability. Accordingly, a permissible range in which the vehicle can move can be narrowed by bringing the restriction position closer to the vehicle in response to a decline in the detection precision with respect to the leading vehicle, namely, the recognition reliability. Doing so enables erroneous lateral direction movement of the vehicle caused by a decline in the detection precision to be halted at an early stage. This thereby enables the vehicle to be driven stably.

The present disclosure may further include an inter-vehicle distance detection section that detects an inter-vehicle distance between the vehicle and the leading vehicle. The lateral direction movement restriction section may set the specific position as the restriction position in cases in which the inter-vehicle distance detected by the inter-vehicle distance detection section is less than or equal to a reference distance, and set a position closer to the vehicle than the specific position as the restriction position in cases in which the inter-vehicle distance is greater than the reference distance.

The detection precision with respect to the leading vehicle declines as the inter-vehicle distance between the vehicle and the leading vehicle increases. According to the present disclosure, for example, the permissible range in which the vehicle can move can be narrowed by bringing the restriction position closer to the vehicle in response to an increase in the inter-vehicle distance, this being one index of the recognition reliability. Doing so enables erroneous lateral direction movement of the vehicle caused by a decline in the detection precision due to an increase in the inter-vehicle distance to be halted at an early stage. This thereby enables the vehicle to be driven stably.

The present disclosure may further include a degree of curvature detection section that detects a degree of curvature of a road on which the vehicle or the leading vehicle is driving. The lateral direction movement restriction section may set the specific position as the restriction position in cases in which the degree of curvature detected by the degree of curvature detection section is less than or equal to a reference degree of curvature, and set a position closer to the vehicle than the specific position as the restriction position in cases in which the degree of curvature is greater than the reference degree of curvature.

The detection precision with respect to the leading vehicle declines as the degree of curvature of the road on which the vehicle and/or the leading vehicle is driving increases. According to the present disclosure, for example, the permissible range in which the vehicle can move can be narrowed by bringing the restriction position closer to the vehicle in response to an increase in the degree of curvature of the road, this being one index of the recognition reliability. Doing so enables erroneous lateral direction movement of the vehicle caused by a decline in the detection precision due to an increase in the degree of curvature of the road to be halted at an early stage. This thereby enables the vehicle to be driven stably.

The present disclosure may further include a gradient detection section that detects a gradient of a road on which the vehicle or the leading vehicle is driving. The lateral direction movement restriction section may set the specific position as the restriction position in cases in which the gradient detected by the gradient detection section is less than or equal to a reference gradient, and set a position closer to the vehicle than the specific position as the restriction position in cases in which the gradient is greater than the reference gradient.

The detection precision with respect to the leading vehicle declines as the gradient of the road on which the vehicle and/or the leading vehicle is driving increases. According to the present disclosure, for example, the permissible range in which the vehicle can move can be narrowed by bringing the restriction position closer to the vehicle in response to an increase in the gradient of the road, this being one index of the recognition reliability. Doing so enables erroneous lateral direction movement of the vehicle caused by a decline in the detection precision due to an increase in the gradient of the road to be halted at an early stage. This thereby enables the vehicle to be driven stably.

The present disclosure may further include a course tracking controller that controls steering of the vehicle so that the vehicle tracks a driving course of the leading vehicle recognized by the leading vehicle recognition section. The course tracking controller may control steering of the vehicle within the movement range demarcated by the restriction position.

According to the present disclosure, for example, when the vehicle is tracking the driving course of the leading vehicle, the permissible range in which the vehicle can move can be narrowed by bringing the restriction position closer to the vehicle in response to a decline in detection precision with respect to the leading vehicle, namely, recognition reliability. Doing so enables erroneous lateral direction movement of the vehicle caused by a decline in the detection precision to be halted at an early stage. This thereby enables the vehicle to be driven stably.

BRIEF DESCRIPTION OF THE DRAWINGS

The advantages of the disclosure will become apparent in the following description taken in conjunction with the following drawings.

FIG. 6 is a flowchart of processing executed by a driving control device of the embodiment.

FIG. 7 is an explanatory diagram of a state of driving course control when a vehicle is about to cross a restriction position.

DETAILED DESCRIPTION

Detailed explanation follows regarding a preferable embodiment of a driving control device according to the present disclosure, with reference to the attached drawings. The present embodiment envisages a driving control device 10 in which the present disclosure is applied to a vehicle that performs course tracking control.

1. Configuration of Driving Control Device 10

Figure 1:
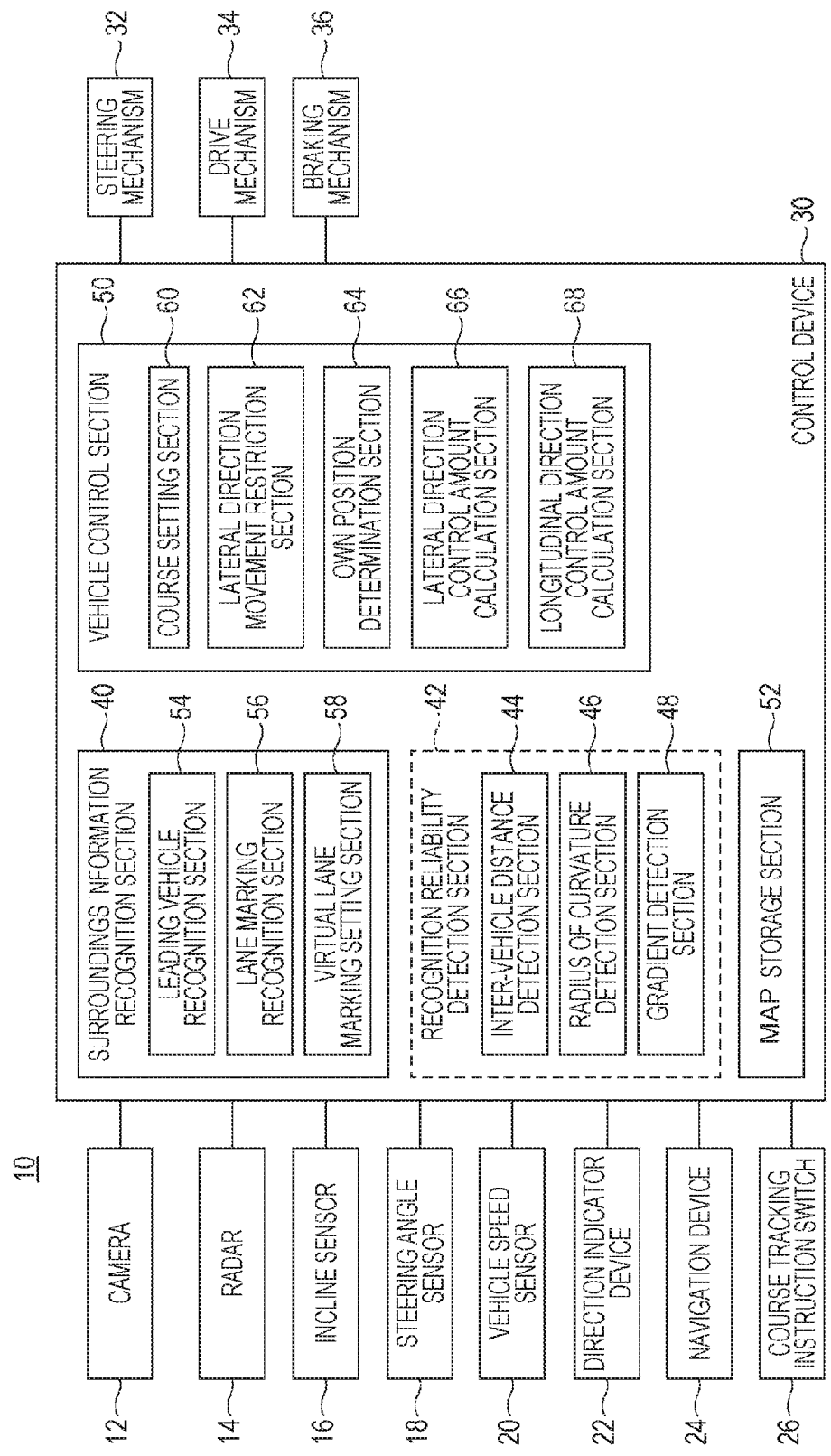
FIG. 1 is a block diagram of a driving control device of an embodiment.

Explanation follows regarding configuration of the driving control device 10 according to the present embodiment, with reference to FIG. 1. The driving control device 10 includes a control device 30 that controls a vehicle 90 (see, for example, FIG. 2A) in accordance with a recognition result for a leading vehicle 92 (see, for example, FIG. 2A), various devices 12, 14, 16, 18, 20, 22, 24 that detect various information to be employed by the control device 30, a course tracking instruction switch 26. The driving control device 10 also includes a steering mechanism 32, a drive mechanism 34, and a braking mechanism 36 that operate based on control instructions output from the control device 30.

A CCD camera is provided as a camera 12. The CCD camera is installed in the vicinity of a rearview mirror. The CCD camera images lane markings 94, the leading vehicle 92, and the like in front of the vehicle 90 to acquire image information. A millimeter wave radar, a microwave radar, a laser radar, or the like is provided as a radar 14. The radar 14 is provided to a front section of the vehicle 90, for example, within a front grill. The radar 14 radiates radio waves in front of the vehicle 90, and detects radio waves reflected by the leading vehicle 92. An infrared sensor, a camera, or the like may be employed instead of the radar 14.

An incline sensor 16 detects an angle of incline (pitch angle) with respect to a horizontal plane, along a front-rear direction of the vehicle 90. Known technology such as a G sensor may be employed as the incline sensor 16. A steering angle sensor 18 detects a rotation angle of the steering wheel (steering shaft). The steering angle sensor 18 detects a degree of curvature of the road on which the vehicle 90 is driving; however, a yaw sensor or a lateral G sensor may be employed instead. A vehicle speed sensor 20 detects the vehicle speed of the vehicle 90. For example, the vehicle speed is calculated from the number of revolutions of the vehicle wheels.

A direction indicator device 22 includes turn lamps provided at the front and rear on both sides of the vehicle 90, a lever provided inside the vehicle cabin, and a controller that controls illumination of the turn lamp in response to operation of the lever.

A navigation device 24 includes a GPS antenna, a GPS receiver, an accelerometer, a gyroscope, a directional sensor, a navigation computer, map information, and the like, and receives vehicle speed signals output from the vehicle speed sensor 20. The navigation device 24 further includes a display that displays road guidance information, and a speaker that outputs audio road guidance information. The navigation device 24 measures the position of the vehicle 90, and acquires road information (such as radius of curvature, and gradient) for that position. A terminal device (beacon unit) that acquires road information provided by an information provision system such as a Vehicle Information and Communication System (VICS) (registered trademark) may be employed instead of the navigation device 24.

The course tracking instruction switch 26 is a switch operated by an occupant of the vehicle 90, and is provided in the cabin of the vehicle 90. The course tracking instruction switch 26 outputs a course tracking control initiation signal in response to operation by the occupant of the vehicle 90.

The control device 30 is configured by an ECU. The ECU is a computation device including a microcomputer, and in addition to a CPU, ROM, RAM, etc., also includes input/output devices such as an A/D converter and a D/A converter. By reading and executing a program recorded in the ROM by the CPU, the ECU functions as various functional sections, specifically, a surroundings information recognition section 40, an inter-vehicle distance detection section 44, a radius of curvature detection section 46, a gradient detection section 48, and a vehicle controller 50. The control device 30 further includes a map storage section 52 that stores various maps (FIG. 5A to FIG. 5C) used when setting restriction positions 96 in the lateral direction of the vehicle 90. The ECU may be divided into plural parts, or may be integrated together with other ECUs. Note that the control device 30 may be configured by an analog circuit.

The surroundings information recognition section 40 includes a leading vehicle recognition section 54, a lane marking recognition section 56, and a virtual lane marking setting section 58. The leading vehicle recognition section 54 is configured to perform image processing based on image information acquired by the camera 12, and to recognize the leading vehicle 92 from the images. Known processing, such as template matching, may be employed in this recognition. Other types of image processing capable of detecting the leading vehicle 92 may alternatively be employed.

The lane marking recognition section 56 is configured to perform image processing based on the image information acquired by the camera 12, and to recognize the lane markings 94 from the image. For example, in cases in which the lane markings 94 are continuous lines or intermittent lines, differential processing is performed based on the image information (source image) acquired by the camera 12 and extracts edges of the lane markings 94. Next, a Hough transform is performed to detect the continuous lines or intermittent lines. In cases in which the lane markings 94 are structures such as Botts' dots, morphological calculations are performed. Technology for detecting the lane markings 94 using image processing is described in, for example, Japanese Unexamined Patent Application Publication No. 2010-170396, the entire contents of which are incorporated herein by reference. Note that other types of image processing capable of detecting the lane markings 94 may also be employed.

The virtual lane marking setting section 58 is configured to set virtual lane markings 94' in cases in which no lane markings 94 were recognized by the lane marking recognition section 56. For example, a lateral direction average position of the leading vehicle 92 within a specific time or a specific driving distance may be found, and virtual lane markings 94' may be set at positions separated from the average position by a fixed distance in the left-right direction. When finding the average position of the leading vehicle 92, a specific portion of the leading vehicle 92, such as a rear face center or both side faces (edges), may be detected.

The inter-vehicle distance detection section 44 is configured to detect an inter-vehicle distance D between the vehicle 90 and the leading vehicle 92 based on a detection result of the radar 14.

The radius of curvature detection section 46 is configured to detect a radius of curvature R as a degree of curvature of the road on which the vehicle 90 and/or the leading vehicle 92 is driving. In addition to being detectable from the lane markings 94 recognized by the lane marking recognition section 56, the radius of curvature R of the road is detectable from information output from the steering angle sensor 18 and from road information output from the navigation device 24. Note that a curvature 1/R may be detected instead of a radius of curvature R. Moreover, the degree of curvature of the road may be detected from the yaw rate or the lateral G.

The gradient detection section 48 is configured to detect the gradient θ of the road that the vehicle 90 and/or leading vehicle 92 is driving on. The gradient θ of the road is detectable from the information output from the incline sensor 16 and from the road information output from the navigation device 24.

The inter-vehicle distance D between the vehicle 90 and the leading vehicle 92, the radius of curvature R of the road, and the gradient θ of the road are indices for gauging the detection precision (recognition reliability) with respect to the leading vehicle 92 by the leading vehicle recognition section 54. These indices are collectively referred to as the recognition reliability. The inter-vehicle distance detection section 44, the radius of curvature detection section 46, and the gradient detection section 48 are collectively referred to as the recognition reliability detection section 42. Details of the recognition reliability are explained in "2. Recognition Reliability" below.

The vehicle controller 50 includes a course setting section 60, a lateral direction movement restriction section 62, an own position determination section 64, a lateral direction control amount calculation section 66, and a longitudinal direction control amount calculation section 68. The vehicle controller 50 may also be referred to as the course tracking controller due to performing course tracking control in the present embodiment. The vehicle controller 50 is configured to operate in response to an initiation signal for course tracking control output from the course tracking instruction switch 26.

The course setting section 60 is configured to set a driving course of the leading vehicle 92 as a driving path of the vehicle 90. The driving course of the leading vehicle 92 is set by sequentially storing positions of the specific portion, for example, the center of the rear face or both side faces (edges) of the leading vehicle 92 identified by the leading vehicle recognition section 54 so as to be arranged in chronological order.

Figure 5A:
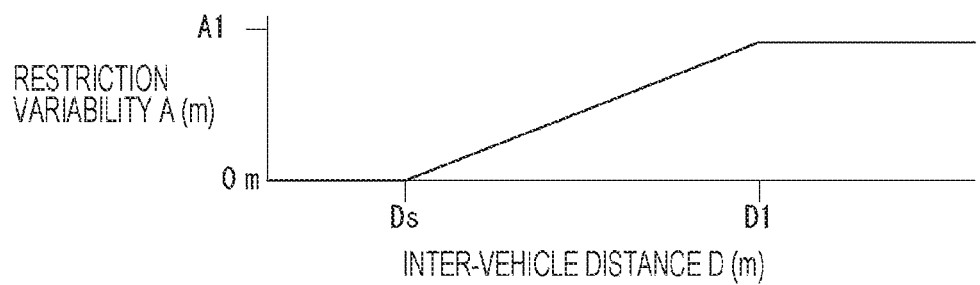
FIG. 5A is a diagram explaining a map of restriction variability against inter-vehicle distance.
Figure 5B:
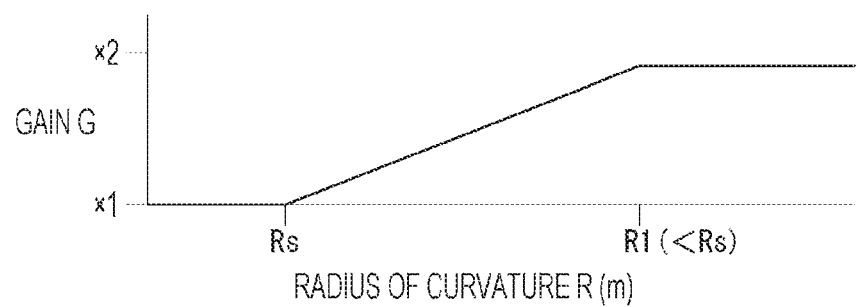
FIG. 5B is a diagram explaining a map of gain against radius of curvature.
Figure 5C:
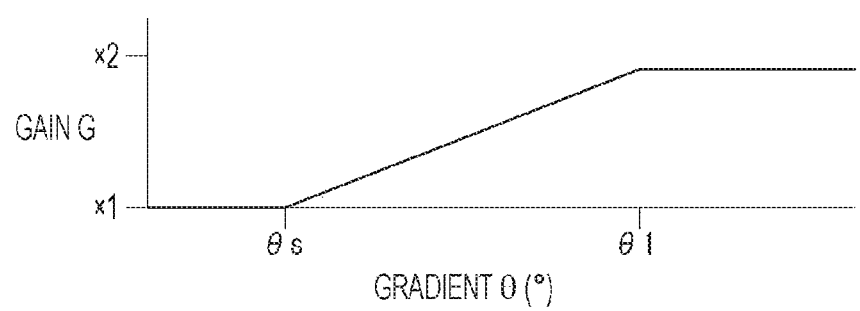
FIG. 5C is a diagram explaining a map of gain against gradient.

The lateral direction movement restriction section 62 is configured to set the restriction positions 96 of a movement range in a lateral direction of the vehicle 90, based on the images captured by the camera 12. The restriction positions 96 may limit or restrict the movement range. The lateral direction movement restriction section 62 takes the lane markings 94 recognized by the lane marking recognition section 56, or the virtual lane markings 94' set by the virtual lane marking setting section 58, as the outermost positions that can be set as the restriction positions 96. Then, in cases in which the recognition reliability for the leading vehicle 92 by the leading vehicle recognition section 54 is greater than or equal to a reference one, the lane markings 94 (including the virtual lane markings 94') are set as the restriction positions 96. However, in cases in which the recognition reliability is lower than the reference, positions closer to the vehicle 90 than the lane markings 94 are set as the restriction positions 96 (further limit the movement range). The distance by which the restriction positions 96 become closer is referred to as the restriction variability A, and is calculated using the map stored in the map storage section 52 (FIG. 5A to FIG. 5C).

The own position determination section 64 is configured to determine respective positions of the vehicle 90 using the positions of the lane markings 94 in the images captured by the camera 12, or the virtual lane markings 94', and from shape information regarding the vehicle 90. The own position determination section 64 is also configured to output an alert inside the cabin in cases in which the distance between a vehicle wheel position or side face position of the vehicle 90 and a restriction position 96 set by the lateral direction movement restriction section 62 becomes a threshold value or less. The alert is issued to the occupant visually, audibly, or by touch, and, for example, may be issued using a display, a speaker, the steering wheel, or a seatbelt.

The lateral direction control amount calculation section 66 is configured to calculate a lateral direction (width direction) movement amount of the vehicle 90, namely, a steering control amount. The lateral direction control amount calculation section 66 calculates a steering amount for aligning a specific portion of the vehicle 90, such as a vehicle lateral direction center, with the driving course of the leading vehicle 92, and outputs a steering instruction. The lateral direction control amount calculation section 66 disengages the course tracking control in cases in which the own position determination section 64 has determined that the vehicle 90 has crossed a restriction position 96. In such an event, a steering amount for returning the vehicle 90 to within the movement range may be calculated.

The longitudinal direction control amount calculation section 68 is configured to calculate a longitudinal direction (overall length direction) movement amount of the vehicle 90, namely, an acceleration/deceleration control amount. The longitudinal direction control amount calculation section 68 calculates a target inter-vehicle distance Dtr based on the vehicle speed, and the acceleration control amount or deceleration control amount is calculated to bring the inter-vehicle distance D detected by the inter-vehicle distance detection section 44 to the target inter-vehicle distance Dtr, and an acceleration instruction or a deceleration instruction is output. The longitudinal direction control amount calculation section 68 disengages course tracking control in cases in which the own position determination section 64 has determined that the vehicle 90 has crossed a restriction position 96.

The map storage section 52 stores maps for use by the lateral direction movement restriction section 62. Respective maps are illustrated in FIG. 5A to FIG. 5C. Explanation regarding each map is given in "2. Recognition Reliability" below.

The steering mechanism 32 includes a device that controls steering, such as electric power steering. For example, the steering mechanism 32 includes an electrical circuit that controls an electric motor in response to a steering instruction output from the control device 30.

The drive mechanism 34 includes a drive source for the vehicle 90, such as an engine and/or an electric motor, and includes a peripheral device that controls the drive source. For example, the drive mechanism 34 includes an actuator that adjusts the degree of opening of a throttle valve in response to an acceleration instruction output from the control device 30, and an electrical circuit that controls an electric motor in response to an acceleration instruction output from the control device 30.

The braking mechanism 36 includes brakes provided to each vehicle wheel, and a peripheral device that controls the respective brakes. For example, the braking mechanism 36 includes a brake actuator that controls the hydraulic pressure of a brake fluid in response to a deceleration instruction output from the control device 30.

2. Recognition Reliability

Figure 2A:
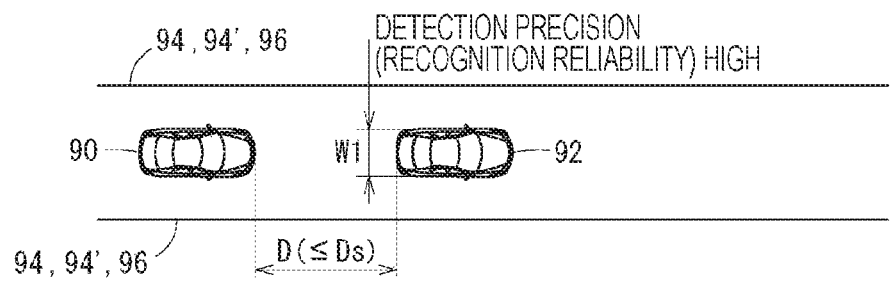
FIG. 2A is an explanatory diagram of a state in which an inter-vehicle distance between a vehicle and a leading vehicle is small.
Figure 2B:
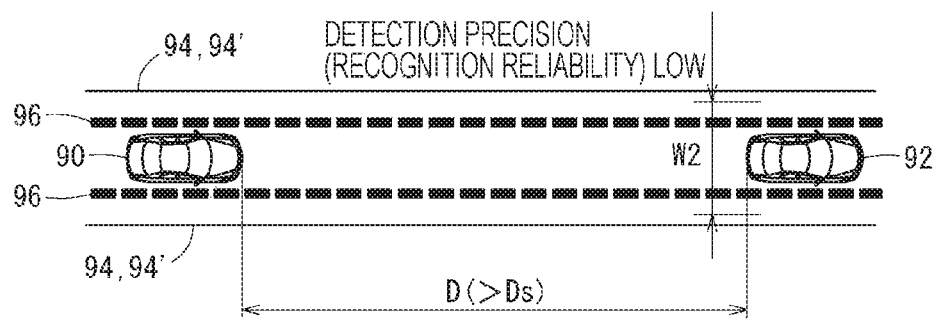
FIG. 2B is an explanatory diagram of a state in which an inter-vehicle distance between a vehicle and a leading vehicle is large.

First, explanation follows regarding the inter-vehicle distance D, this being one index of the recognition reliability, with reference to FIG. 2A and FIG. 2B. As illustrated in FIG. 2A, the recognition reliability improves as the inter-vehicle distance D between the vehicle 90 and the leading vehicle 92 decreases, and the leading vehicle recognition section 54 recognizes the leading vehicle 92 within a width W1 equivalent to the vehicle width. Conversely, as illustrated in FIG. 2B, the recognition reliability declines as the inter-vehicle distance D between the vehicle 90 and the leading vehicle 92 increases, and the leading vehicle recognition section 54 recognizes the leading vehicle 92 within a width W2 larger than the vehicle width. In the present embodiment, a reference for the inter-vehicle distance D, this being one index of the recognition reliability, is set to a reference distance Ds. As illustrated in FIG. 2A, the recognition reliability is high in cases in which the inter-vehicle distance D is the reference distance Ds or less. Moreover, as illustrated in FIG. 2B, the recognition reliability is low in cases in which the inter-vehicle distance D is greater than the reference distance Ds.

The map illustrated in FIG. 5A is used to identify the restriction variability A used to derive the restriction positions 96 according to the inter-vehicle distance D. In the map illustrated in FIG. 5A, the restriction variability A becomes 0 m in cases in which the inter-vehicle distance D is the reference distance Ds or less (in cases in which the recognition reliability is high), and the positions of the lane markings 94 are set as the restriction positions 96. Setting the restriction positions 96 to the lane markings 94 enables the vehicle 90 to approach very close to the lane markings 94. In the map illustrated in FIG. 5A, the restriction variability A is gradually raised in cases in which the inter-vehicle distance D is greater than the reference distance Ds (in cases in which the recognition reliability is low), such that the restriction positions 96 are gradually brought closer to the vehicle 90 from the lane markings 94. This restricts lateral direction movement of the vehicle 90 due to narrowing the movement range of the vehicle 90. The restriction variability A becomes a maximum value A1 when the inter-vehicle distance D reaches D1 or greater.

Figure 3A:
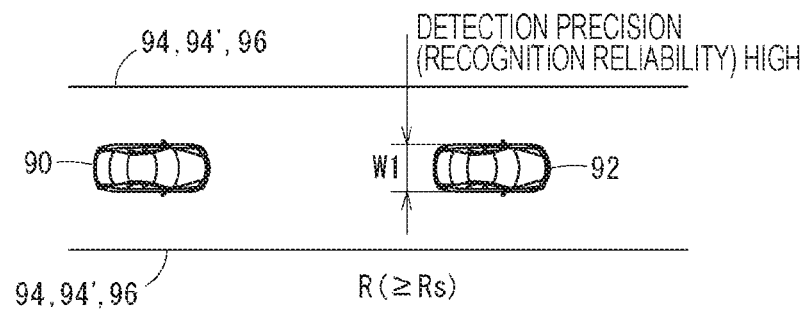
FIG. 3A is an explanatory diagram of a state in which a road on which a vehicle and a leading vehicle are driving is a straight road.
Figure 3B:
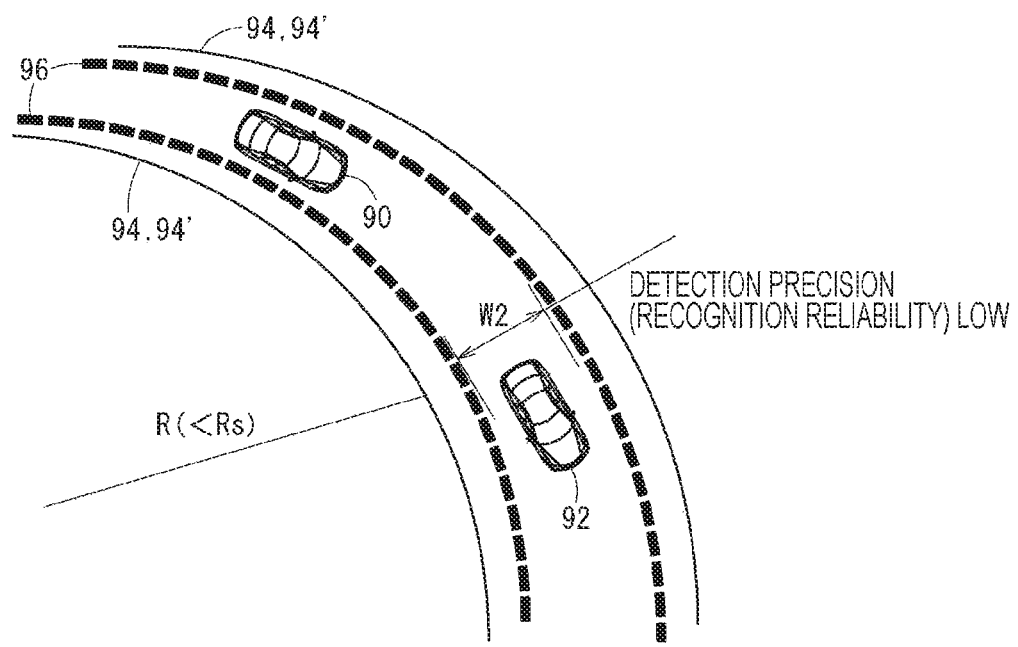
FIG. 3B is an explanatory diagram of a state in which a road on which a vehicle and a leading vehicle are driving is a curved road.

Next, explanation follows regarding the degree of curvature of the road, in this example the radius of curvature R, this being one index of the recognition reliability, with reference to FIG. 3A and FIG. 3B. As illustrated in FIG. 3A, the recognition reliability improves as the radius of curvature R of the road on which the vehicle 90 and/or the leading vehicle 92 is driving increases, and the leading vehicle recognition section 54 recognizes the leading vehicle 92 within the width W1 equivalent to the vehicle width. As illustrated in FIG. 3B, the recognition reliability declines as the radius of curvature R of the road on which the vehicle 90 and/or the leading vehicle 92 is driving decreases, and the leading vehicle recognition section 54 recognizes the leading vehicle 92 within the width W2 greater than the vehicle width. In the present embodiment, a reference for the radius of curvature R, this being one index of the recognition reliability, is set to a reference radius of curvature Rs. As illustrated in FIG. 3A, the recognition reliability is high in cases in which the radius of curvature R is the reference radius of curvature Rs or greater, and the recognition reliability is low in cases in which the radius of curvature R is lower than the reference radius of curvature Rs.

The map illustrated in FIG. 5B is used to identify a gain G, used to correct the restriction variability A, according to the radius of curvature R. In FIG. 5B, the values of the radius of curvature R indicated by the horizontal axis decrease on progression from the left side to the right side of the diagram. In the map illustrated in FIG. 5B, the gain G is ×1 in cases in which the radius of curvature R is the reference radius of curvature Rs or greater (in cases in which the recognition reliability is high). In the map illustrated in FIG. 5B, the gain G is gradually raised in cases in which the radius of curvature R is smaller than the reference radius of curvature Rs (in cases in which the recognition reliability is low). The gain G reaches a maximum value of ×2 when the radius of curvature R is R1 or less.

Figure 4A:
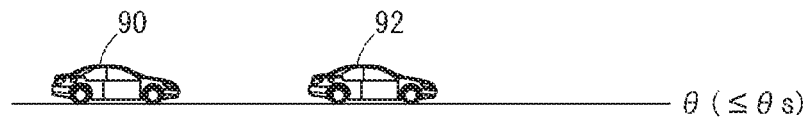
FIG. 4A is an explanatory diagram of a state in which a road on which a vehicle and a leading vehicle are driving is a level road.
Figure 4B:
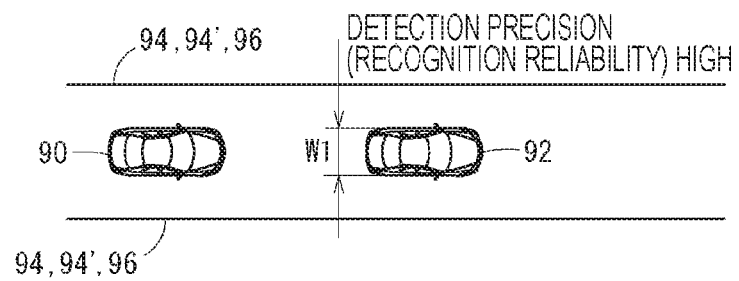
FIG. 4B is an explanatory diagram of a state in which a road on which a vehicle and a leading vehicle are driving is a level road.
Figure 4C:
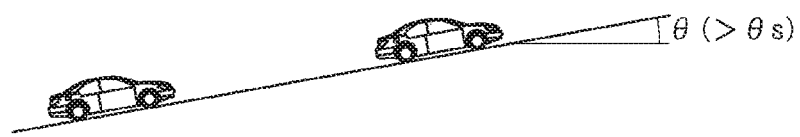
FIG. 4C is an explanatory diagram of a state in which a road on which a vehicle and a leading vehicle are driving is a road with a gradient.
Figure 4D:
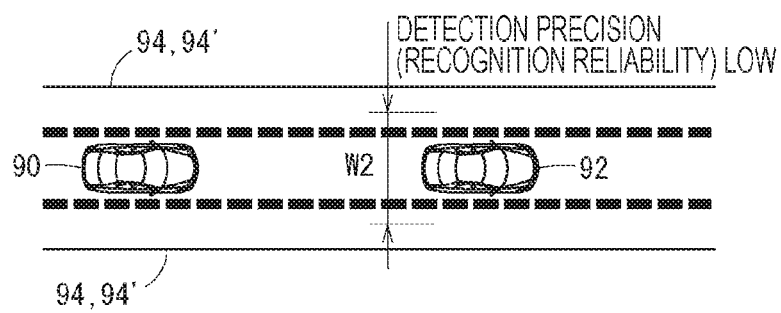
FIG. 4D is an explanatory diagram of a state in which a road on which a vehicle and a leading vehicle are driving is a road with a gradient.

Next, explanation follows regarding the gradient θ of the road, this being one index of the recognition reliability, with reference to FIG. 4A to FIG. 4D. As illustrated in FIG. 4A and FIG. 4B, the recognition reliability improves as the gradient θ of the road on which the vehicle 90 and/or the leading vehicle 92 is driving decreases, and the leading vehicle recognition section 54 recognizes the leading vehicle 92 within the width W1 equivalent to the vehicle width. As illustrated in FIG. 4C and FIG. 4D, the recognition reliability declines as the gradient θ of the road on which the vehicle 90 and/or the leading vehicle 92 is driving increases, and the leading vehicle recognition section 54 recognizes the leading vehicle 92 within the width W2 greater than the vehicle width. In the present embodiment, a reference for the gradient θ, this being one index of the recognition reliability, is set to a reference gradient θs. As illustrated in FIG. 4A and FIG. 4B, the recognition reliability is high in cases in which the gradient θ is the reference gradient θs or less. Moreover, as illustrated in FIG. 4C and FIG. 4D, recognition reliability is low in cases in which the gradient θ is greater than the reference gradient θs.

The map illustrated in FIG. 5C is used to identify the gain G, used for correcting the restriction variability A, according to the gradient θ. In the map illustrated in FIG. 5C the gain G is ×1 in cases in which the gradient θ is the reference gradient θs or less (in cases in which the recognition reliability is high). In the map illustrated in FIG. 5C, the gain G gradually increases in cases in which the gradient θ is greater than the reference gradient θs (in cases in which the recognition reliability is low). The gain G reaches a maximum value of ×2 when the gradient θ becomes θ1 or greater.

In the map illustrated in FIG. 5A, a relationship between the inter-vehicle distance D and the restriction variability A is set; however, a relationship between the inter-vehicle distance D and the gain G may be set. In the map illustrated in FIG. 5B, a relationship between the radius of curvature R and the gain G is set; however, a relationship between the radius of curvature R and the restriction variability A may be set. In the map illustrated in FIG. 5C, a relationship between the gradient θ and the gain G is set; however, a relationship between the gradient θ and the restriction variability A may be set.

Instead of employing each of the inter-vehicle distance D, the radius of curvature R, and the gradient θ as the recognition reliability, one or two of these may be employed as the recognition reliability. Moreover, if there are other indices for gauging the detection precision with respect to the leading vehicle 92 by the leading vehicle recognition section 54, such indices may also be employed.

3. Processing by Driving Control Device 10

Explanation follows regarding processing executed by the driving control device 10 during vehicle driving, with reference to FIG. 6. The driving control device 10 initiates the course tracking control when the course tracking instruction switch 26 is operated by the occupant.

At step S1, the inter-vehicle distance detection section 44 detects the inter-vehicle distance D between the vehicle 90 and the leading vehicle 92 based on a detection signal output from the radar 14. At step S2, the camera 12 captures an image of the surroundings of the vehicle 90.

At step S3, the leading vehicle recognition section 54 and the lane marking recognition section 56 perform image processing. The leading vehicle recognition section 54 recognizes the leading vehicle 92 and detects the lateral position of the leading vehicle 92. The lane marking recognition section 56 recognizes the lane markings 94 and detects the position of the lane markings 94.

At step S4, determination is made as to whether or not the positions of the lane markings 94 could be detected. Processing transitions to step S6 in cases in which the lane marking recognition section 56 was able to detect the positions of the lane markings 94. Conversely, the lane marking recognition section 56 is not able to detect the positions of the lane markings 94 in cases in which no lane markings 94 are present on the road, or in cases in which the lane markings 94 have faded. Processing transitions to step S5 in cases in which the lane marking recognition section 56 was not able to detect the positions of the lane markings 94.

At step S5, the virtual lane marking setting section 58 sets the virtual lane markings 94' according to a recognition result of the leading vehicle recognition section 54.

At step S6, the radius of curvature detection section 46 detects the radius of curvature R of the road based on at least one out of a recognition result of the lane marking recognition section 56, a detection result of the steering angle sensor 18, or the road information from the navigation device 24. The gradient detection section 48 detects the gradient θ of the road based on at least one out of a detection result of the incline sensor 16 or the road information from the navigation device 24.

At step S7, the lateral direction movement restriction section 62 computes the restriction variability A according to the inter-vehicle distance D. Here, the lateral direction movement restriction section 62 uses the map of the restriction variability A against the inter-vehicle distance D (see FIG. 5A) stored by the map storage section 52 in order to derive the restriction variability A corresponding to the inter-vehicle distance D.

At step S8, the lateral direction movement restriction section 62 computes correction amounts (gain G) for the restriction variability A according to the radius of curvature R and the gradient θ of the road. Here, the lateral direction movement restriction section 62 uses the map of the gain G against the radius of curvature R (see FIG. 5B) stored by the map storage section 52 to derive the gain G corresponding to the radius of curvature R detected at step S6. The lateral direction movement restriction section 62 uses the map of the gain G against the gradient θ (see FIG. 5C) stored by the map storage section 52 to derive the gain G corresponding to the gradient θ detected at step S6.

At step S9, the lateral direction movement restriction section 62 sets the lateral direction restriction positions 96 of the vehicle 90 based on the lane markings 94 (including the virtual lane markings 94') and the restriction variability A. Here, the lateral direction movement restriction section 62 multiplies the restriction variability A derived at step S7 by the two gains G derived at step S8, to derive a corrected restriction variability A'. Then, the restriction positions 96 are set to positions separated toward the vehicle lane inside (the vehicle 90 side) of the positions of the lane markings 94 by the amount of the restriction variability A'. The restriction positions 96 are set at both sides of the vehicle 90.

At step S10, the vehicle controller 50 performs course tracking control within the movement range demarcated by the restriction positions 96. The course setting section 60 sequentially stores the positions of the specific portion of the leading vehicle 92, and sets the driving course of the leading vehicle 92. The own position determination section 64 determines the vehicle wheel positions or the side face positions of the vehicle 90. The lateral direction control amount calculation section 66 calculates the steering amount for aligning the specific portion of the vehicle 90 with the driving course of the leading vehicle 92, and outputs a steering instruction. The longitudinal direction control amount calculation section 68 calculates the acceleration control amount or the deceleration control amount to bring the inter-vehicle distance D to the target inter-vehicle distance Dtr corresponding to the vehicle speed, and outputs an acceleration instruction or a deceleration instruction. The steering mechanism 32, the drive mechanism 34, and the braking mechanism 36 operate in response to the respective instructions.

As illustrated in FIG. 7, cases are envisaged in which the vehicle 90 appears to be about to cross a restriction position 96 when the vehicle 90 is tracking a driving course 98 of the leading vehicle 92. In such cases, the own position determination section 64 issues an alert to the driver. If the vehicle 90 still appears to be about to cross the restriction position 96 after the alert, the vehicle controller 50 disengages the course tracking control. In such an event, the lateral direction control amount calculation section 66 calculates a steering amount to return the vehicle 90 to within the restriction positions 96, and outputs a steering instruction. The steering mechanism 32 operates in response to the steering instruction, and keeps the vehicle 90 within the movement range demarcated by the restriction positions 96.

However, the course tracking control remains engaged in cases in which the lever of the direction indicator device 22 has been operated and the turn lamp is flashing to indicate the same direction as the direction of the restriction position 96 that the vehicle 90 is approaching out of the restriction positions 96 set on both sides of the vehicle 90.

4. Summary of Present Embodiment

The driving control device 10 of the present embodiment includes the camera 12 (imaging section) that captures images of the surroundings of the vehicle 90, the leading vehicle recognition section 54 that recognizes the leading vehicle 92 from the images captured by the camera 12, and the lateral direction movement restriction section 62 that sets the restriction positions 96 of the movement range in the lateral direction of the vehicle 90 based on the image captured by the camera 12. The lateral direction movement restriction section 62 sets the lane markings 94 (specific positions) as the restriction positions 96 in cases in which the recognition reliability for the leading vehicle 92 by the leading vehicle recognition section 54 is greater than or equal to the references. Conversely, positions closer to the vehicle 90 than the lane markings 94 are set as the restriction positions 96 in cases in which the recognition reliability is lower than the reference. As illustrated in FIG. 2A, the lateral direction movement restriction section 62 brings the restriction positions 96 closer to the vehicle 90 as the recognition reliability declines.

The driving control device 10 includes the inter-vehicle distance detection section 44 that detects the inter-vehicle distance D between the vehicle 90 and the leading vehicle 92. The lateral direction movement restriction section 62 sets the lane markings 94 as the restriction positions 96 in cases in which the inter-vehicle distance D detected by the inter-vehicle distance detection section 44 is less than or equal to the reference distance Ds. Conversely, positions closer to the vehicle 90 than the lane markings 94 are set as the restriction positions 96 in cases in which the inter-vehicle distance D is greater than the reference distance Ds.

The driving control device 10 includes a radius of curvature detection section 46 (degree of curvature detection section) that detects the radius of curvature R (degree of curvature) of the road on which the vehicle 90 or the leading vehicle 92 is driving. The lateral direction movement restriction section 62 sets the lane markings 94 as the restriction positions 96 in cases in which the radius of curvature R detected by the radius of curvature detection section 46 is greater than or equal to the reference radius of curvature Rs (in cases in which the curvature is the reference curvature or less). Conversely, a position closer to the vehicle 90 than the lane markings 94 is set as the restriction positions 96 in cases in which the radius of curvature R is less than the reference radius of curvature Rs (in cases in which the curvature is greater than the reference curvature).

The driving control device 10 includes the gradient detection section 48 that detects the gradient θ of the road on which the vehicle 90 or the leading vehicle 92 is driving. The lateral direction movement restriction section 62 sets the lane markings 94 as the restriction positions 96 in cases in which the gradient θ detected by the gradient detection section 48 is less than or equal to the reference gradient θs. Conversely, positions closer to the vehicle 90 than the lane markings 94 are set as the restriction positions 96 in cases in which the gradient θ is greater than the reference gradient θs.

The driving control device 10 includes the vehicle controller 50 (the course tracking controller) that controls steering of the vehicle 90 such that the vehicle 90 tracks the driving course 98 of the leading vehicle 92 recognized by the leading vehicle recognition section 54. The course tracking controller 50 controls steering of the vehicle 90 within the movement range demarcated by the restriction positions 96.

In the driving control device 10, determination of the detection precision with respect to the leading vehicle 92 is made using indices, namely, the recognition reliability, and more specifically the inter-vehicle distance D, the radius of curvature R of the road, and the gradient θ of the road. According to the driving control device 10, a permissible range in which the vehicle 90 can move can be narrowed by bringing the restriction positions 96 closer to the vehicle 90 in response to a decline in the detection precision, with respect to the leading vehicle 92, namely, the recognition reliability. Doing so enables erroneous movement in the lateral direction of the vehicle 90 due to a decline in the detection precision to be halted at an early stage. This enables the vehicle 90 to be driven stably.

5. Other Embodiments

The embodiment described above is a driving control device 10 in which the present disclosure is applied to a vehicle that performs course tracking control. There is no limitation thereto. For example, the present disclosure may be applied to a vehicle provided with road departure mitigation functionality. In particular, the virtual lane markings 94' may be set in accordance with the recognition result with respect to the leading vehicle 92, and application may be made to a vehicle that performs road departure mitigation control using the virtual lane markings 94'.

A vehicle that performs road departure mitigation control using the virtual lane markings 94' sets the virtual lane markings 94' as the restriction positions 96 of the movement range of the vehicle 90, and issues in advance a warning in cases in which the vehicle 90 is predicted to cross the virtual lane markings 94'. In cases in which the vehicle 90 still appears to be about to cross the virtual lane markings 94', departure of the vehicle 90 from the vehicle lane is mitigated by controlling the steering mechanism 32.

The present disclosure enables the restriction positions 96 to be brought closer to the vehicle 90 from the virtual lane markings 94' in accordance with the recognition reliability when applied to a vehicle that uses the virtual lane markings 94' to perform road departure mitigation control. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A driving control device comprising:
    an imaging section that captures an image of surroundings of an own vehicle;
    a leading vehicle recognition section that recognizes a leading vehicle from the image captured by the imaging section;
    a course tracking controller that controls steering of the own vehicle so that the own vehicle tracks a driving course of the leading vehicle recognized by the leading vehicle recognition section;
    a lateral direction movement restriction section that, based on the image captured by the imaging section, sets a restriction position for a movement range of the own vehicle in a lateral direction of the own vehicle such that tracking movement of the own vehicle in the lateral direction controlled by the course tracking controller is limited within the movement range demarcated by the restriction position; and
    the lateral direction movement restriction section adjusts the restriction position in accordance with a recognition reliability of the leading vehicle by the leading vehicle recognition section such that the lateral direction movement restriction section sets the restriction position at a predetermined specific position in cases in which the recognition reliability is greater than or equal to a reference reliability, and sets the restriction position at a position closer to the own vehicle in the lateral direction than the specific position in cases in which the recognition reliability is lower than the reference reliability.

2. The driving control device according to claim 1, wherein:
    the lateral direction movement restriction section sets the restriction position closer to the own vehicle as the recognition reliability declines.

3. The driving control device according to claim 1, further comprising:
    an inter-vehicle distance detection section that detects an inter-vehicle distance between the own vehicle and the leading vehicle; and
    the lateral direction movement restriction section setting the restriction position at the specific position in cases in which the inter-vehicle distance detected by the inter-vehicle distance detection section is less than or equal to a reference distance, and setting the restriction position at a position closer to the own vehicle than the specific position in cases in which the inter-vehicle distance is greater than the reference distance.

4. The driving control device according to claim 3, further comprising:
    a degree of curvature detection section that detects a degree of curvature of a road on which the own vehicle or the leading vehicle is driving,
    wherein the lateral direction movement restriction section modifies the restriction position by using the detected degree of curvature such that when the degree of curvature is greater than a reference degree of curvature, the lateral direction movement restriction section moves the restriction position closer to the own vehicle.

5. The driving control device according to claim 3, further comprising:
a gradient detection section that detects a gradient of a road on which the own vehicle or the leading vehicle is driving,
wherein the lateral direction movement restriction section modifies the restriction position by using the detected gradient of the road such that when the gradient is greater than a reference gradient, the lateral direction movement restriction section moves the restriction position closer to the own vehicle.

6. The driving control device according to claim 1, further comprising:
a degree of curvature detection section that detects a degree of curvature of a road on which the own vehicle or the leading vehicle is driving; and
the lateral direction movement restriction section setting the restriction position at the specific position in cases in which the degree of curvature detected by the degree of curvature detection section is less than or equal to a reference degree of curvature, and setting the restriction position at a position closer to the own vehicle than the specific position in cases in which the degree of curvature is greater than the reference degree of curvature.

7. The driving control device according to claim 1, further comprising:
a gradient detection section that detects a gradient of a road on which the own vehicle or the leading vehicle is driving; and
the lateral direction movement restriction section setting the restriction position at the specific position in cases in which the gradient detected by the gradient detection section is less than or equal to a reference gradient, and setting the restriction position at a position closer to the own vehicle than the specific position in cases in which the gradient is greater than the reference gradient.

8. The driving control device according to claim 1, wherein
the course tracking controller controlling steering of the vehicle within the movement range demarcated by the restriction position.

9. The driving control device according to claim 1, wherein the recognition reliability is a detection precision with respect to the leading vehicle.

10. The driving control device according to claim 1, wherein the predetermined specific position is a position of a lane marking of a road on which the own vehicle or the leading vehicle is driving.

11. A driving control device comprising:
an imaging device that captures an image of surroundings of an own vehicle;
a leading vehicle recognition ECU that recognizes a leading vehicle from the image captured by the imaging device;
a lateral direction movement restriction ECU that, based on the image captured by the imaging device, sets a restriction position for a movement range of the own vehicle in a lateral direction of the own vehicle; and
the lateral direction movement restriction ECU setting the restriction position at a predetermined specific position in cases in which a recognition reliability of the leading vehicle by the leading vehicle recognition ECU is greater than or equal to a reference reliability, and setting the restriction position at a position closer to the own vehicle than the specific position in cases in which the recognition reliability is lower than the reference reliability.

12. A driving control method comprising steps of:
capturing an image of surroundings of an own vehicle by an imaging device;
recognizing, by a computer, a leading vehicle from the captured image;
based on the captured image, setting, by the computer, a restriction position for a movement range of the own vehicle in a lateral direction of the own vehicle by setting the restriction position at a predetermined specific position in cases in which a recognition reliability of the leading vehicle by the recognizing step is greater than or equal to a reference reliability, and setting the restriction position at a position closer to the own vehicle than the specific position in cases in which the recognition reliability is lower than the reference reliability.

* * * * *